(12) United States Patent
Seger et al.

(10) Patent No.: US 8,550,237 B2
(45) Date of Patent: Oct. 8, 2013

(54) CONVEYOR UNIT FOR A TRANSPORT SYSTEM OF ARTICLES AND TRANSPORT SYSTEM

(75) Inventors: Martin Seger, Neumarkt i. d. Opf. (DE); Stefan Heigl, Aholfing (DE); Johann Huettner, Mallersdorf-Pfaffenberg (DE)

(73) Assignee: Krones AG, Neutraubling (DE)

( * ) Notice: Subject to any disclaimer, the term of this patent is extended or adjusted under 35 U.S.C. 154(b) by 100 days.

(21) Appl. No.: 13/050,537

(22) Filed: Mar. 17, 2011

(65) Prior Publication Data
US 2011/0226590 A1    Sep. 22, 2011

(30) Foreign Application Priority Data
Mar. 19, 2010    (DE) .......................... 10 2010 016 020

(51) Int. Cl.
*B65G 15/14*    (2006.01)
(52) U.S. Cl.
USPC .................... 198/817; 198/415; 198/461.1
(58) Field of Classification Search
USPC .............. 198/415, 817, 374, 382, 394, 461.1, 198/461.2
See application file for complete search history.

(56) References Cited

U.S. PATENT DOCUMENTS

| | | | | |
|---|---|---|---|---|
| 1,199,818 A * | 10/1916 | Peck | ........................... | 198/817 |
| 1,689,201 A * | 10/1928 | Halter | ........................... | 198/579 |
| 1,841,714 A * | 1/1932 | Cone | ........................... | 198/606 |
| 2,880,847 A * | 4/1959 | Kelley | ........................... | 198/303 |
| 3,024,888 A * | 3/1962 | Lasnier | ........................ | 198/462.1 |
| 3,187,878 A * | 6/1965 | Harrison et al. | ............... | 198/572 |
| 3,431,921 A * | 3/1969 | Pesek | ........................... | 134/127 |
| 3,518,944 A * | 7/1970 | Patin | ........................... | 198/789 |
| 3,592,139 A * | 7/1971 | Patin | ........................... | 198/321 |
| 3,665,863 A * | 5/1972 | Patin | ........................... | 198/321 |
| 4,287,983 A * | 9/1981 | Bronsveld | .................... | 198/817 |
| 4,453,386 A * | 6/1984 | Wilkins | ......................... | 68/19.1 |
| 4,720,006 A * | 1/1988 | Lenherr | ........................ | 198/415 |
| 5,341,915 A * | 8/1994 | Cordia et al. | .............. | 198/460.1 |
| 5,918,725 A * | 7/1999 | Farina | .......................... | 198/415 |
| 6,186,312 B1 * | 2/2001 | Schererz | ....................... | 198/406 |
| 6,669,006 B2 * | 12/2003 | Antoniazzi et al. | ......... | 198/461.1 |
| 7,290,646 B2 * | 11/2007 | Mustalahti et al. | ........... | 198/334 |
| 7,314,130 B2 | 1/2008 | de Geus et al. | | |

(Continued)

FOREIGN PATENT DOCUMENTS

| | | |
|---|---|---|
| CN | 1087594 | 6/1994 |
| CN | 1367131 | 9/2002 |

(Continued)

*Primary Examiner* — Gene Crawford
*Assistant Examiner* — Keith R Campbell
(74) *Attorney, Agent, or Firm* — Simpson & Simpson, PLLC (57) ABSTRACT

A conveyor unit for a transport system of articles including a first conveyor chain and a second conveyor chain, located one downstream from the other in a direction of transport. The first and the second conveyor chain each comprise two conveyor sub-chains, which are arranged in such a way that a region of overlap is formed between a conveyor sub-chain of the first conveyor chain and a conveyor sub-chain of the second conveyor chain. During the transfer from the first conveyor chain onto the region of overlap and from there onto the second conveyor chain the article is always supported by at least one conveyor sub-chain. A velocity of at least one conveyor sub-chain therein is such that an alteration of a state of motion of the article is achievable within the conveyor element. Furthermore a transport system for articles is disclosed, which comprises a plurality of conveyor elements.

18 Claims, 8 Drawing Sheets

(56) References Cited

U.S. PATENT DOCUMENTS

| | | | |
|---|---|---|---|
| 7,448,490 B2 | 11/2008 | de Geus et al. | |
| 7,578,382 B2 * | 8/2009 | Kujat et al. | 198/461.1 |
| 7,762,381 B2 * | 7/2010 | Mustalahti et al. | 198/321 |
| 7,938,247 B2 * | 5/2011 | Kujat et al. | 198/415 |
| 2008/0283362 A1 * | 11/2008 | Kujat et al. | 198/461.2 |

FOREIGN PATENT DOCUMENTS

| | | |
|---|---|---|
| CN | 1519178 | 8/2004 |
| CN | 1956909 | 5/2007 |
| DE | 16 84 038 B | 12/1970 |
| DE | 29 25 073 A1 | 1/1980 |
| DE | 34 46 461 C1 | 7/1986 |
| DE | 602 02 383 T2 | 4/2006 |
| DE | 10 2008 026 045 A1 | 12/2009 |
| DE | 10 2008 058 428 A1 | 5/2010 |
| EP | 1 546 011 B1 | 2/2008 |
| WO | 2009143960 A1 | 12/2009 |

\* cited by examiner

CONVEYOR UNIT FOR A TRANSPORT SYSTEM OF ARTICLES AND TRANSPORT SYSTEM

CROSS-REFERENCE TO RELATED APPLICATIONS

This Patent Application claims the benefit of German Patent Application No. 10 2010 016 020.2, filed on Mar. 19, 2010, which is hereby incorporated by reference in its entirety.

FIELD OF THE INVENTION

The invention relates to a conveyor unit for a transport system. Additionally, the invention refers to a transport system for articles.

BACKGROUND OF THE INVENTION

The German patent application DE 29 25 073 A1 describes a chain conveyor with a plurality of endless chains located one next to the other, which carry the objects to be transported and are drivable by engaging chain wheels on common drive shafts. Therein the chains, due to being mounted in a cassette, are removable and changeable individually and independently of each other. The cassette comprises a frame which forms a guide for the rollers of the chain and in which the chain wheels are mounted in bearings. The chain wheels thus are not carried by the drive shafts, which can be pulled out axially in order to facilitate the removal of a cassette.

The German patent document DE 34 46 461 C2 discloses an apparatus supplying a processing machine via a single-lane discharge conveyor of a conveyor system with containers like bottles, cans or the like. The velocity of the articles on the conveyor belt essentially is changed within a transfer zone. Therein articles guided in one lane are transferred by a lateral transfer element from a first transport chain to a second transport chain located downstream from the first transport chain in the direction of transport. The first and the second transport chain therein can transport the articles with different velocities.

The German patent application DE 10 2008 026 045 A1 relates to an apparatus, located in particular downstream of pasteurizing units in filling systems for bottles in order to reliably remove possibly occurring shards of bottles with metal caps from the further transport path. This is achieved by two transport belts located one after the other and carrying the bottles, with a gap between the transport belts allowing the shards to drop off, wherein over the gap a magnetic head conveyor for seizing the intact bottles and transferring them hanging down across the gap.

The European patent EP 1 546 011 B1 describes a conveyor system with an endless first conveyor belt and a second endless conveyor belt separated from the first by a gap and arranged transversely to it, wherein an intermediate element is provided in the gap. The first and the second conveyor belt may consist of one or plural rows of subsequent modules.

According to the state of the art for the transfer of articles from one transport chain to a different transport chain, straight or lateral transfer systems are used. With straight transfer systems frequently a transfer guide between the transport chains is used. Undesirable effects of this solution are a slowing down, stopping or falling over of the articles. Lateral transfer systems allow a transfer of the articles onto a parallel transport chain by a guide rail arranged transversely or of curved shape, respectively. A disadvantage of this concept is an undesirable slowing down and displacing of the articles amongst each other, as well as the increased space requirements. A transfer of articles between transport chains is for example necessary, if the velocity at which the articles are to be transported in a particular section of a transport system needs to be changed with respect to the velocity in other sections. This for example can be the case, if the distance between subsequent articles is to be changed. Therein the uncontrolled slowing down and displacing of the articles mentioned are a disadvantage. Furthermore, any redirection of the articles from the original direction of transport involves the risk of a congestion forming and thus of a downtime of the processing machine.

BRIEF SUMMARY OF THE INVENTION

Therefore it is an object of the invention to configure a conveyor unit for a transport system of articles in such a way that within the conveyor unit a reliable, secure and defined alteration of the state of motion of the articles is possible, without a congestion or falling over of the articles, and thus without a possible downtime of the transport system.

The above object is achieved by a conveyor unit having a first drivable conveyor chain and a second drivable conveyor chain, wherein the second conveyor chain is located downstream from the first conveyor chain in a direction of transport. Two conveyor sub-chains form a conveyor chain wherein the conveyor sub-chains are arranged in such a way that a region of overlap between a conveyor sub-chain of the first conveyor chain and a conveyor sub-chain of the second conveyor chain is formed. A velocity of at least one conveyor sub-chain is such that an alteration of a state of motion of the articles transported in the direction of transport is achievable within the conveyor unit.

A further object of the invention to provide a transport system for articles which has a plurality of conveyor units which allows a secure and defined alteration of the state of motion of the transported articles, without a congestion or falling over of the articles, and thus without a possible downtime of the transport system.

The above object is achieved by a transport system for articles, comprises a plurality of conveyor units wherein at least two conveyor units are located one downstream from the other along a transport stream of articles and wherein at least two conveyor units are arranged parallel to each other. A first drivable conveyor and a second drivable conveyor chain each form the conveyor units, wherein the second conveyor chain is located downstream from the first conveyor chain in a direction of transport. Two conveyor sub-chains form each of the conveyor chains, wherein the conveyor sub-chains are arranged in such a way that a region of overlap between a conveyor sub-chain of the first conveyor chain and a conveyor sub-chain of the second conveyor chain is formed. A velocity of at least one conveyor sub-chain is such that an alteration of a state of motion of the articles transported in the direction of transport is achievable within the conveyor unit.

The conveyor unit for a transport system of articles according to the invention comprises a first conveyor chain and a second conveyor chain. Each of the conveyor chains is drivable, in order to transport the articles in a direction of transport. The second conveyor chain therein is located after the first conveyor chain in the direction of transport, and thus is located downstream from the first conveyor chain in the direction of transport. The first and the second conveyor chain of the conveyor unit according to the invention are not displaced transversely to the direction of transport with respect to each other, which provides for a configuration of reduced space requirements. According to the invention both the first conveyor chain and the second conveyor chain are divided in two conveyor sub-chains each, which preferentially are endless chains. The conveyor sub-chains are arranged in such a way within the conveyor unit that a region of overlap is formed between a conveyor sub-chain of the first conveyor chain and a conveyor sub-chain of the second conveyor chain. Therein a velocity of at least one conveyor sub-chain is such that an alteration of a state of motion of the articles transported in the direction of transport is achievable within the conveyor unit.

Preferentially those conveyor sub-chains between which the region of overlap is formed are conducted via a respective redirecting means each in the region of overlap. The redirecting means are displaced along the direction of transport with respect to each other. Thus the redirecting means are not coaxial, do not revolve on a common axis, nor do they exhibit a common geometrical axis transverse to the direction of transport. In particular embodiments the redirecting means may be comprised of rollers or chain wheels.

Due to the arrangement of the conveyor sub-chains described it is assured that during the transfer of an article from the first conveyor chain to the second conveyor chain the article is always supported by at least one conveyor sub-chain. Before the region of overlap the article is on the first conveyor chain and is supported by both the conveyor sub-chains of the first conveyor chain. Between a conveyor sub-chain of the first conveyor chain and a conveyor sub-chain of the second conveyor chain which is located downstream in the direction of transport from the conveyor sub-chain of the first conveyor chain without a displacement transverse to the direction of transport there is a gap in front of the region of overlap. While crossing this gap into the region of overlap the article is supported by the conveyor sub-chain of the first conveyor chain which continues in the direction of transport in the region of the gap and which defines the region of overlap together with a conveyor sub-chain of the second conveyor chain. Within the region of overlap the article is supported by that conveyor sub-chain of the first conveyor chain and that conveyor sub-chain of the second conveyor chain which define the region of overlap.

After the region of overlap there is a gap between that conveyor sub-chain of the first conveyor chain which is involved in the formation of the region of overlap and a conveyor sub-chain of the second conveyor chain located downstream in the direction of transport from this conveyor sub-chain of the first conveyor chain without a displacement transverse to the direction of transport. While crossing this gap out of the region of overlap the article is supported by that conveyor sub-chain of the second conveyor chain which continues in the direction of transport in the region of the gap and defines the region of overlap together with a conveyor sub-chain of the first conveyor chain. After the region of overlap the article is on the second conveyor chain and is supported by both the conveyor sub-chains of the second conveyor chain. In this way the article is stabilized during the transfer from the first to the second conveyor chain.

An advantageous further development consists in conducting, in the region of at least one gap between conveyor sub-chains which are located one after the other in the direction of transport, the top section of the respective conveyor sub-chain continuing through this region at an increased height with respect to the top sections of the conveyor sub-chains located one after the other in the direction of transport in this region. In this way instabilities of the article during transfer across the respective gap between the conveyor sub-chains are avoided even more reliably, in particular the establishment of a rotary motion of the article is reduced, which necessarily is caused by the different velocities of the conveyor sub-chains at least in the region of overlap.

In some embodiments of the invention the conveyor sub-chains are drivable with different velocities. The conveyor unit can for example be configured in such a way that at least one conveyor sub-chain is drivable with a first velocity, and at least one further conveyor sub-chain is drivable with a second velocity, which is different from the first velocity. Also, in different embodiments, the conveyor unit may be configured such that all conveyor sub-chains are drivable, each with a separately settable respective velocity. The setting of the velocity therein for example can be accomplished by controlling separate drive systems for the conveyor sub-chains, by setting gear units or transmissions coupling various conveyor sub-chains to a common drive system, or by changing over the respective gear units or transmissions.

If for example the conveyor sub-chains of the first conveyor chain are driven with a first velocity, and the conveyor sub-chains of the second conveyor chain are driven with a second velocity, which is different from the first velocity, the velocity of an article may be changed by transferring the article from the first conveyor chain to the second conveyor chain. As has been explained above, the article is stabilized during this change of velocity due to the arrangement of the conveyor sub-chains. If the conveyor unit is configured with top sections of the conveyor sub-chains at increased heights with respect to each other in the fashion already described above, it is largely avoided that the article starts to rotate during the transfer from the first conveyor chain to the second conveyor chain.

If in a different embodiment the conveyor sub-chains of a conveyor chain are driven with different velocities, a rotary motion of the article around an axis parallel to gravity can specifically be caused. This can be advantageous if the article is passing through a processing apparatus. If the processing apparatus is for example a drying tunnel, a more uniform drying of the article from all sides is achieved by the rotary motion. As an alternative possibility for inducing a rotary motion, the conveyor sub-chains of the first conveyor chain could be driven with a first velocity, and the conveyor sub-chains of the second conveyor chain driven with a second velocity, which is different from the first velocity. In the region of overlap between a conveyor sub-chain of the first conveyor chain and a conveyor sub-chain of the second conveyor chain a rotary motion of the article is induced. The region of overlap therein is sufficiently long for the respective process step, for example the passage through a drying tunnel.

Preferentially a width of the first conveyor chain is equal to a width of the second conveyor chain, wherein width herein means the extension in a direction perpendicular to the plane defined by the direction of gravity and the direction of transport. The width advantageously is such that the article transported is completely supported, so that the width of each conveyor chain at least has to be equal to a diameter (effective diameter) of the articles transported by the conveyor unit, and, in order to exhibit tolerances with respect to the position of the articles, has to be larger than a diameter of the articles transported by the conveyor unit; the diameter of an article here usually refers to the effective diameter of the article. Support of the article by different conveyor sub-chains or combinations of conveyor sub-chains during the transfer from the first conveyor chain to the second conveyor chain requires that the article is guided approximately centrally on the conveyor chains; this advantageously is achieved, if the width of a conveyor chain is only negligibly larger than the diameter of the article transported. Preferentially all conveyor sub-chains of the conveyor unit exhibit an equal width, so that there is a symmetry in the support of the article by the conveyor sub-chains, which contributes to a reduction of instabilities during the transport of the article.

In embodiments the conveyor sub-chains may be driven by a center drive; this for example may drive the conveyor sub-chains of at least one conveyor chain. As an alternative both the conveyor sub-chains of at least one conveyor chain may be driven by a motor in cooperation with a drive-belt system. In these cases a gear may be provided, by which a difference between the velocities at which the respective conveyor sub-chains are drivable, can be achieved. In other embodiments to each conveyor unit there corresponds a motor, which drives both the conveyor sub-chains of the first conveyor chain and the conveyor sub-chains of the second conveyor chain. In these embodiments at least one force transmission means with at least one gear is provided, through which at least one difference between the respective velocities, at which the respective conveyor sub-chains are drivable, can be achieved.

In preferred embodiments to the conveyor unit there corresponds at least one frame module, in which the conveyor sub-chains are mounted. The frame module exhibits a first frame module end and a second frame module end, which are located opposite each other in the direction of transport. At least one conveyor sub-chain of the conveyor unit therein extends beyond at least one frame module end. The frame module exhibits a side element on either side of the conveyor chains. The side elements extend along the direction of transport. For fixing and stabilization both side elements are connected with each other for example via cross members. Each conveyor sub-chain may revolve within the frame module, i.e. the bottom section of a respective conveyor sub-chain is running between the side elements, below the respective top section, against the direction of transport. A motor for driving the conveyor unit advantageously is provided on the frame module, preferentially on a side element. It is furthermore advantageous to provide guide elements extending along the direction of transport, like for example plates or rails, on the frame module, preferentially on either side of the conveyor chains, by which the articles transported are guided laterally. The distance between the rails is slightly larger than the effective diameter of the articles transported.

A transport system can in principle comprise a plurality of conveyor units according to the invention. An integration of a conveyor unit according to the invention into a transport system is advantageously achieved by connecting means provided at least on a first frame module end or at least on a second frame module end of the conveyor unit, by which a connection of the conveyor unit with at least one further element of the transport system is achievable. It is explicitly included here that at least one further element is also a frame module. In this way also further conveyor chains may be provided upstream and/or downstream in the direction of transport from the conveyor unit according to the invention. Therein according to the invention each conveyor chain is divided into two conveyor sub-chains, and corresponding regions of overlap between conveyor sub-chains are formed. If the various conveyor chains are driven at different velocities, for example a change of velocity of the articles transported is possible in plural steps. It is also conceivable to provide plural conveyor units according to the invention along a stream of articles in a transport system. These conveyor units may immediately follow one another, or one or plural further elements of the transport system, here also including processing stations for the articles, may be provided in between.

A plurality of conveyor units according to the invention may also be provided within a transport system in parallel to each other, so that articles can be transported on parallel tracks or lanes. Therein guides for the articles may be provided, wherein the guides either correspond to a respective conveyor unit or are provided between neighboring conveyor units. Also, within a transport system, the parallel arrangement of conveyor units according to the invention can be combined with an arrangement in series of conveyor units along a transport stream, depending on the respective requirements.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
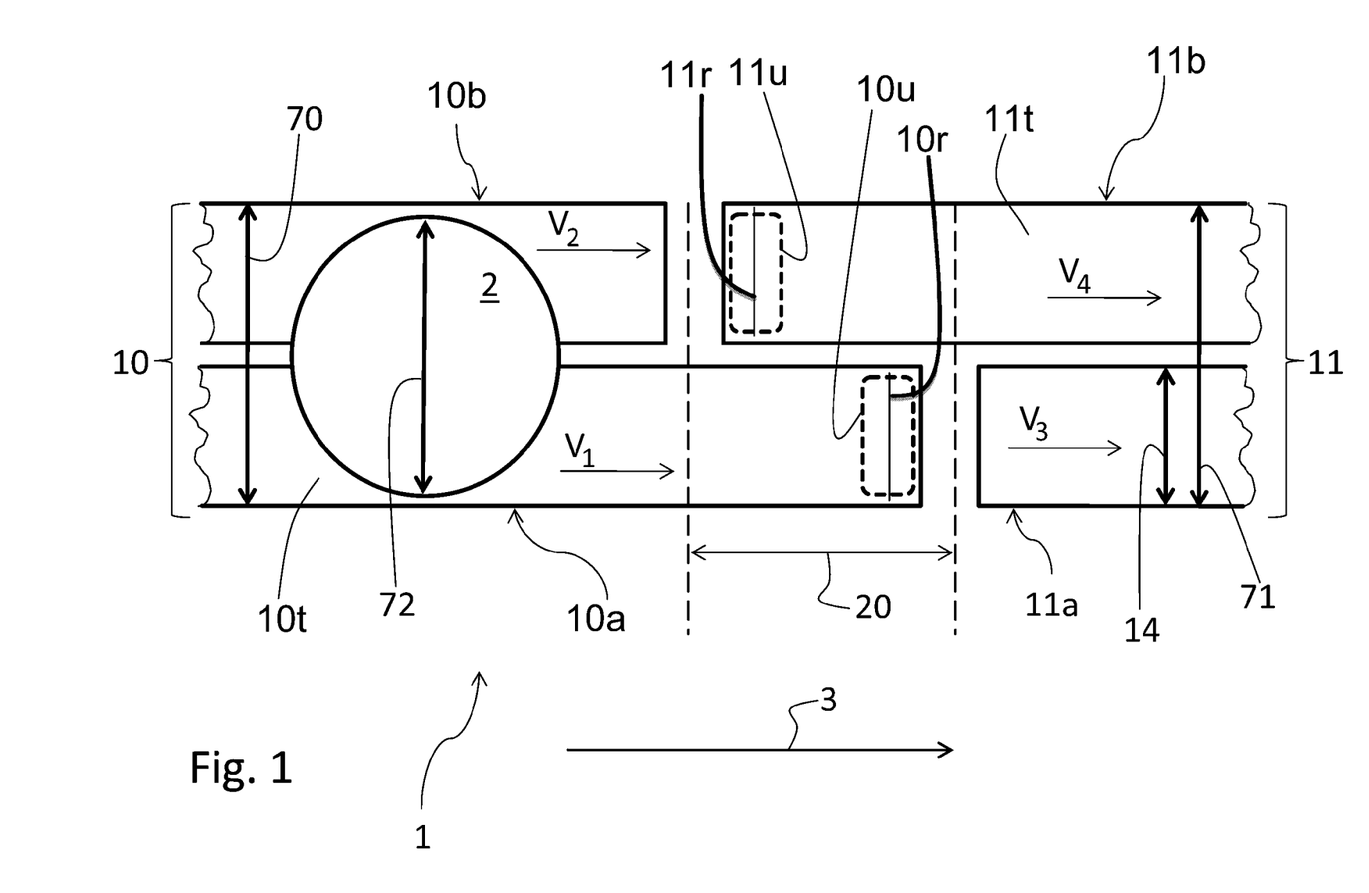
FIG. 1 shows a top view of a part of a schematic arrangement of the conveyor sub-chains of a conveyor unit according to the invention.

Referring now to the figures, FIG. 1 schematically shows the principle of the arrangement of the conveyor sub-chains 10a, 10b, 11a, 11b according to an embodiment of the conveyor unit 1 according to the invention. The conveyor unit 1 exhibits a first conveyor chain 10 and a second conveyor chain 11. The first conveyor chain 10 consists of a first conveyor sub-chain 10a and a second conveyor sub-chain 10b. The second conveyor chain 11 consists of a first conveyor sub-chain 11a and a second conveyor sub-chain 11b. The conveyor sub-chains 10a, 10b, 11a, 11b each form an endless chain. There is shown only a section of each of the conveyor sub-chains 10a, 10b, 11a, 11b. In the embodiment shown the conveyor sub-chains are drivable with separately settable velocities $V_1, V_2, V_3, V_4$, in order to transport an article 2 in a direction of transport 3. The conveyor sub-chains 10a, 10b, 11a, 11b therein are arranged in such a way that a region of overlap 20 between the first conveyor sub-chain 10a of the first conveyor chain 10 and the second conveyor sub-chain 11b of the second conveyor chain 11 is formed. The assignment of the attributes "first" and "second" to conveyor sub-chains is done for purposes of description and is not to be taken as a limitation of the invention. According to the invention a region of overlap 20 is formed between a conveyor sub-chain of the first conveyor chain 10 and a conveyor sub-chain of the second conveyor chain 11. For the description of this and of the subsequent figures we adhere to the convention that the conveyor sub-chain of the first conveyor chain 10 extending into the region of overlap 20 is referred to as the first conveyor sub-chain 10a of the first conveyor chain 10, and the conveyor sub-chain of the second conveyor chain 11 extending into the region of overlap 20 is referred to as the second conveyor sub-chain 11b of the second conveyor chain. The further two conveyor sub-chains correspondingly are the second conveyor sub-chain 10b of the first conveyor chain 10 and the first conveyor sub-chain 11a of the second conveyor chain 11. In the region of overlap 20 the first conveyor sub-chain 10a of the first conveyor chain 10 is conducted via a first redirecting means 10u, by which the top section 10t supporting the article 2 of the first conveyor sub-chain 10a of the first conveyor chain 10 is directed to a return section which is not shown. Analogously the second conveyor sub-chain 11b of the second conveyor chain 11 is conducted via a second redirecting means 11u in the region of overlap 20, by which the top section 11t of the second conveyor sub-chain 11b of the second conveyor chain 11 is directed out of a return section which is not shown. The redirecting means 10u, 11u are displaced with respect to each other in the direction of transport 3. In the embodiment shown in particular an axis 10r of the first redirecting means 10u aligned transversely to the direction of transport is displaced in the direction of transport 3 with respect to a corresponding axis 11r of the second redirecting means 11u. The redirecting means 10u, 11u thus are not coaxial.

The conveyor sub-chains 10a, 10b, 11a, 11b coincide in a width 14. A width 70 of the first conveyor chain 10 is equal to a width 71 of the second conveyor chain 11. The width 70, 71 of the conveyor chains 10, 11 therein preferentially is slightly larger than a diameter of the article 2 transported, wherein it is essentially the effective diameter that matters, so that the article essentially is situated centrally on the first conveyor chain 10 or on the second conveyor chain 11, respectively. In this way it is assured that the article 2 is always supported sufficiently by at least one conveyor sub-chain 10a, 10b, 11a, 11b during the transfer from the first conveyor chain 10 through the region of overlap 20 onto the second conveyor chain 11. Thus the width of the conveyor sub-chains is preferentially slightly larger than half the effective diameter and, particularly preferred, is between 50% and 75% of the effective diameter.

Figure 2:
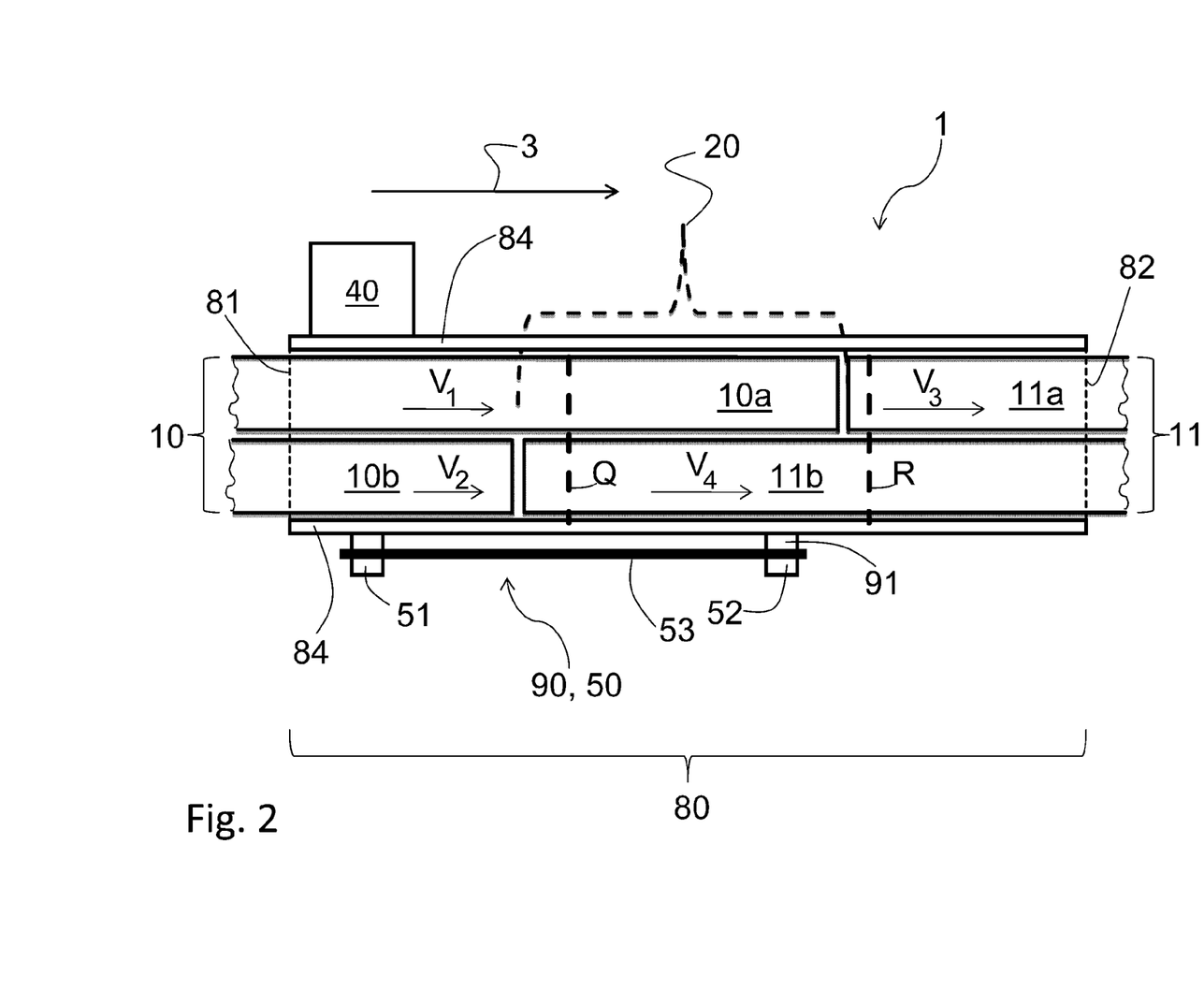
FIG. 2 is a schematic top view of an embodiment of the conveyor unit according to the invention.

FIG. 2 shows a schematic top view of an embodiment of the conveyor unit 1 according to the invention with a first conveyor chain 10, comprising a first conveyor sub-chain 10a and a second conveyor sub-chain 10b, and a second conveyor chain 11, comprising a first conveyor sub-chain 11a and a second conveyor sub-chain 11b. A region of overlap 20 is formed between the first conveyor sub-chain 10a of the first conveyor chain 10 and the second conveyor sub-chain 11b of the second conveyor chain 11. In the embodiment shown the conveyor unit 1 exhibits a frame module 80 with a first frame module end 81 and a second frame module end 82, located opposite each other in a direction of transport 3. The conveyor sub-chains 10a and 10b of the first conveyor chain 10 and the conveyor sub-chains 11a and 11b of the second conveyor chain 11 extend beyond the frame module ends 81 and 82, respectively, in the embodiment shown. The frame module 80 exhibits a side element 84 on either side of the conveyor chains 10, 11. The side elements 84 extend along the direction of transport 3.

On a side element 84 there is provided a motor 40, which drives the first conveyor sub-chain 10a of the first conveyor chain 10 with a first velocity $V_1$ and the second conveyor sub-chain 10b of the first conveyor chain 10 with a second velocity $V_2$. In the embodiment shown this is accomplished in cooperation with a force transmission means 90. The force transmission means 90 in this embodiment is a drive-belt system 50 provided on an outer side of a side element 84 and comprising a first shaft 51, a second shaft 52 and a drive-belt 53. It is obvious to a person skilled in the art that different force transmission means 90 may also be used. The force transmission means 90 may for example also be located within the frame module 80. In the embodiment shown a gear 91 is provided, by which a difference between the first velocity $V_1$ and the second velocity $V_2$ is settable.

In an extension of this embodiment the motor 40, in cooperation with a further force transmission means not shown, could also drive the first conveyor sub-chain 11a of the second conveyor chain 11 at a third velocity $V_3$ and the second conveyor sub-chain 11b of the second conveyor chain 11 with a fourth velocity $V_4$. The further force transmission means therein may exhibit a further gear (not shown), by which a difference between the third velocity $V_3$ and the fourth velocity $V_4$ is settable. It is obvious to a person skilled in the art that therein all velocities $V_1, V_2, V_3, V_4$ may be different, and also, that at least two of the velocities $V_1, V_2, V_3, V_4$ may be equal.

Figure 3:
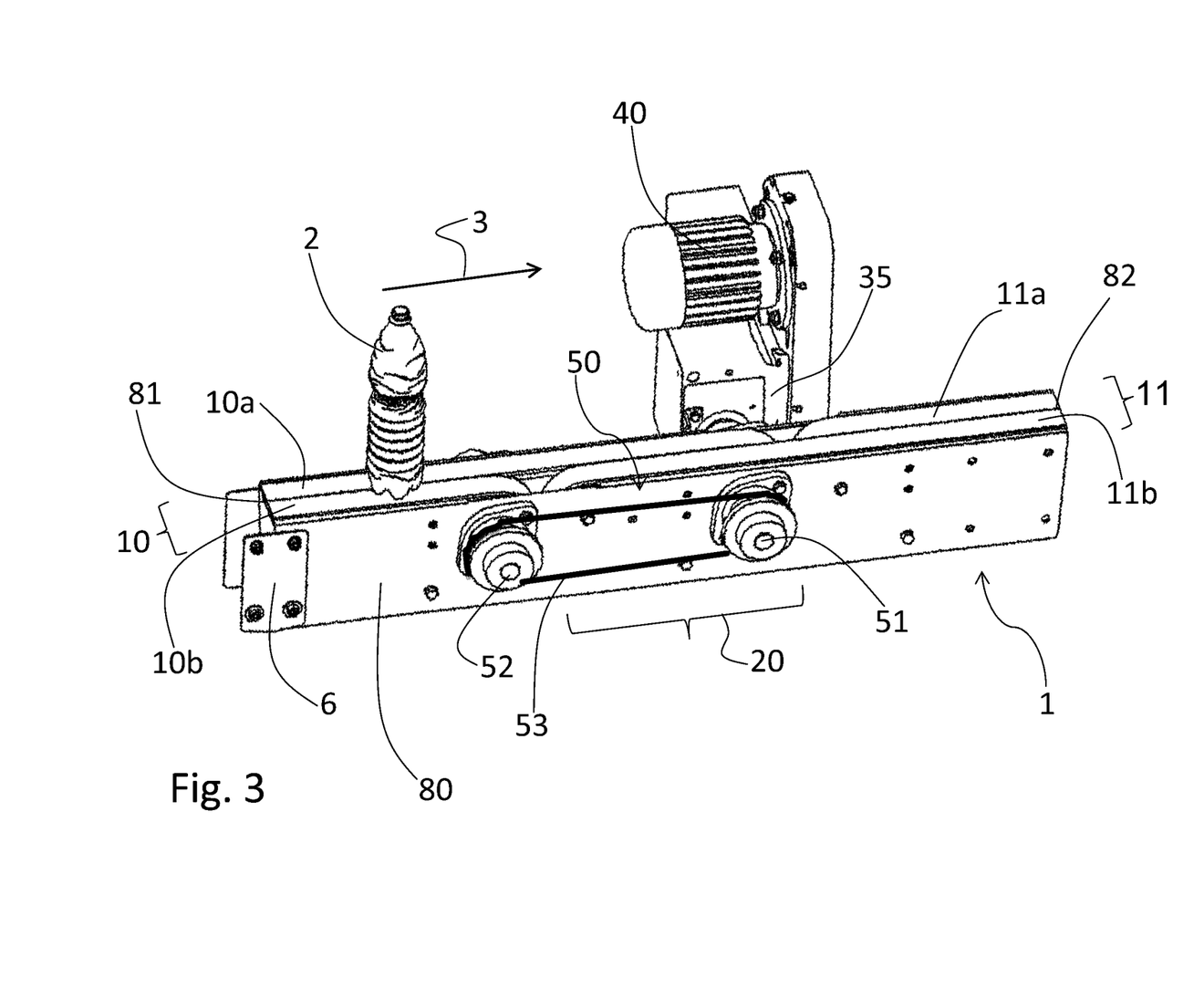
FIG. 3 is a perspective view of an embodiment of the conveyor unit according to the invention.

FIG. 3 is a perspective view of an embodiment of the conveyor unit 1 according to the invention. A motor 40 and a gear 35 are provided on a frame module 80 of the conveyor unit 1. The motor 40 is provided for driving the conveyor sub-chains 10a and 10b of the first conveyor chain 10. A transmission of force from the motor 40 to the second conveyor sub-chain 10b of the first conveyor chain 10 is effected by a drive-belt system 50 comprising a first shaft 51, a second shaft 52 and a drive-belt 53. A region of overlap 20 is formed between the first conveyor sub-chain 10a of the first conveyor chain 10 and the second conveyor sub-chain 11b of the second conveyor chain 11. An article 2, which here has the shape of a bottle, is shown supported by the first conveyor sub-chain 10a and the second conveyor sub-chain 10b of the first conveyor chain 10. The article is transported along a direction of transport 3. A first frame module end 81 and a second frame module end 82 are located opposite each other in the direction of transport 3. A connecting means 6 is provided at the first frame module end 81, by which the frame module 80 can be connected with further elements of a transport system (not shown). It is obvious that an analogous connecting means may also be provided at the second frame module end 82. It is furthermore obvious to a person skilled in the art that the gap between the first conveyor sub-chain 10a of the first conveyor chain 10 and the first conveyor sub-chain 11a of the second conveyor chain 11 as well as the gap between the second conveyor sub-chain 10b of the first conveyor chain 10 and the second conveyor sub-chain 11b of the second conveyor chain 11 in embodiments of the invention may each be closed with a slide plate.

Figure 4:
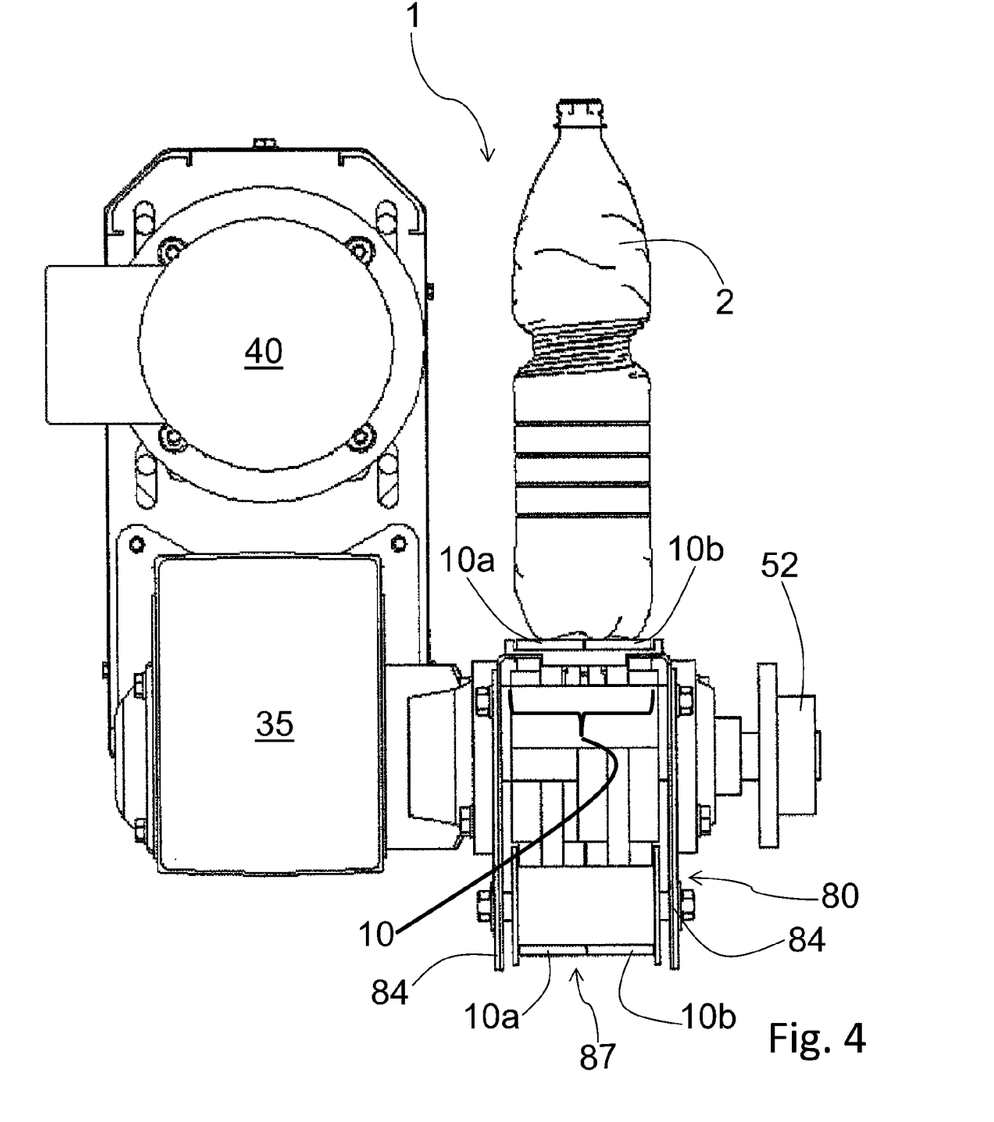
FIG. 4 is a view in the direction of transport of the embodiment of FIG. 3 of the conveyor unit according to the invention.

FIG. 4 is a view in the direction of transport 3 (in this figure orthogonal to the plane of the drawing, see FIG. 3) of the embodiment of FIG. 3 of the conveyor unit 1 according to the invention. In FIG. 3 all essential elements have already been described. The article 2 is shown supported by the first conveyor sub-chain 10a and the second conveyor sub-chain 10b of the first conveyor chain 10. Evidently the article 2 is located approximately centrally on the first conveyor chain 10 so that it is essentially supported in equal parts by the first conveyor sub-chain 10a and the second conveyor sub-chain 10b of the first conveyor chain 10. Between the side elements 84 of the frame module 80 a return section 87 of the conveyor sub-chains 10a, 10b of the first conveyor chain 10 is shown.

Figure 5A:
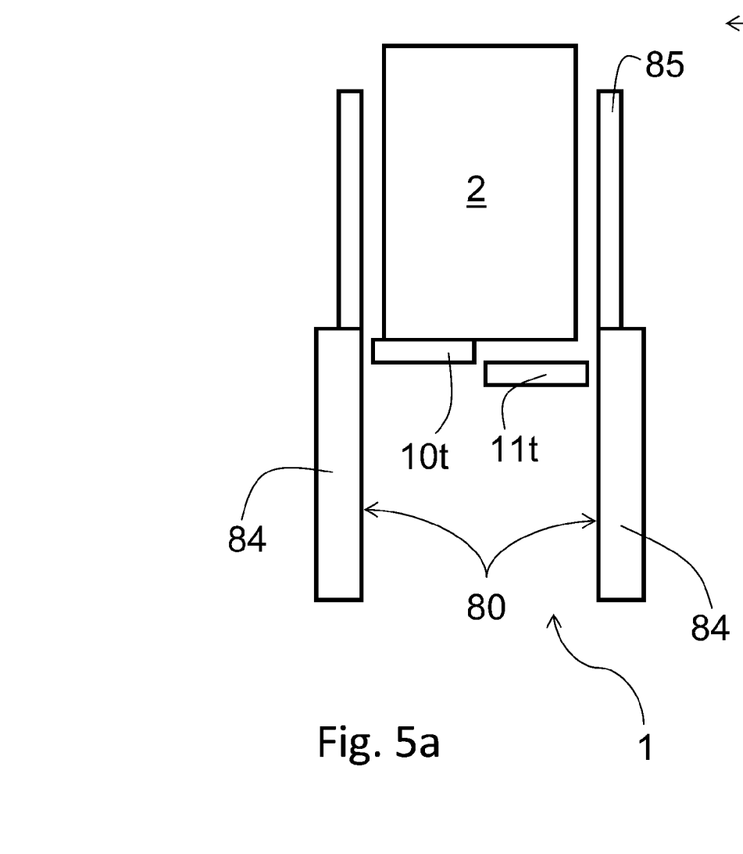
FIG. 5a and FIG. 5b show a schematic cross section of an embodiment of the conveyor unit according to the invention.
Figure 5B:
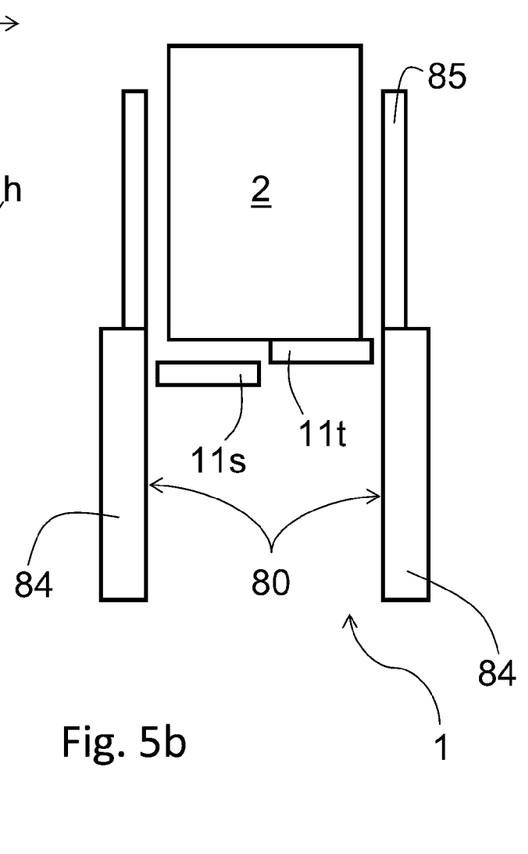

FIG. 5a and FIG. 5b are schematic representations as cross sections of an embodiment of the conveyor unit 1 according to the invention. A direction of transport 3 (see FIG. 2) is directed orthogonally into the plane of the drawing. On side elements 84 of a frame module 80 straight guides 85 are provided on either side, which guide an article 2 laterally, i.e. in a direction 4 transverse to the direction of transport 3, so that the article 2 follows a defined track or lane. FIG. 5a shows a cross section in a region immediately after the gap between the second conveyor sub-chain 10b (see FIG. 2) of the first conveyor chain 10 (see FIG. 2) and the second conveyor sub-chain 11b (see FIG. 2) of the second conveyor chain 11 (see FIG. 2), as indicated, for example, by the line Q in FIG. 2. FIG. 5b shows a cross section in a region immediately after the gap between the first conveyor sub-chain 10a (see FIG. 2) of the first conveyor chain 10 (see FIG. 2) and the first conveyor sub-chain 11a (see FIG. 2) of the second conveyor chain 11 (see FIG. 2), as indicated, for example, by the line R in FIG. 2.

In the embodiment shown, as is shown in FIG. 5a, in the region of the cross section shown the top section 10t of the first conveyor sub-chain 10a of the first conveyor chain 10 is conducted at an increased height relative to the top section 11t of the second conveyor sub-chain 11b of the second conveyor chain 11, i.e. there is a difference in the height level, i.e. the position in a vertical direction h, between the top section 10t of the first conveyor sub-chain 10a of the first conveyor chain 10 and the top section 11t of the second conveyor sub-chain 11b of the second conveyor chain 11. During the transfer across the gap between the second conveyor sub-chain 10b of the first conveyor chain 10 and the second conveyor sub-chain 11b of the second conveyor chain 11 the article 2 is, according to the invention, supported by the first conveyor sub-chain 10a, here more precisely by the top section 10t of the first conveyor sub-chain 10a of the first conveyor chain 10. Due to the difference in the height level exhibited by this embodiment, the article 2 is additionally stabilized with respect to its state of motion during the transfer across the gap between the second conveyor sub-chain 10b of the first conveyor chain 10 and the second conveyor sub-chain 11b of the second conveyor chain 11, in particular the establishment of a rotary motion of the article 2 is reduced.

In an analogous fashion, as shown in FIG. 5b, the top section 11t of the second conveyor sub-chain 11b of the second conveyor chain 11 is conducted at an increased height with respect to the top section 11s of the first conveyor sub-chain 11a of the second conveyor chain 11 in the region of the cross section shown. With regard to the additional stabilization of the state of motion of the article 2 statements analogous to those made in the context of FIG. 5a apply.

It is stressed explicitly that in this embodiment the guides 85 are not restricted to the region of the cross sections along the lines Q or R, respectively, just discussed. On the contrary, the guides 85 extend along the conveyor unit 1.

Figure 6:
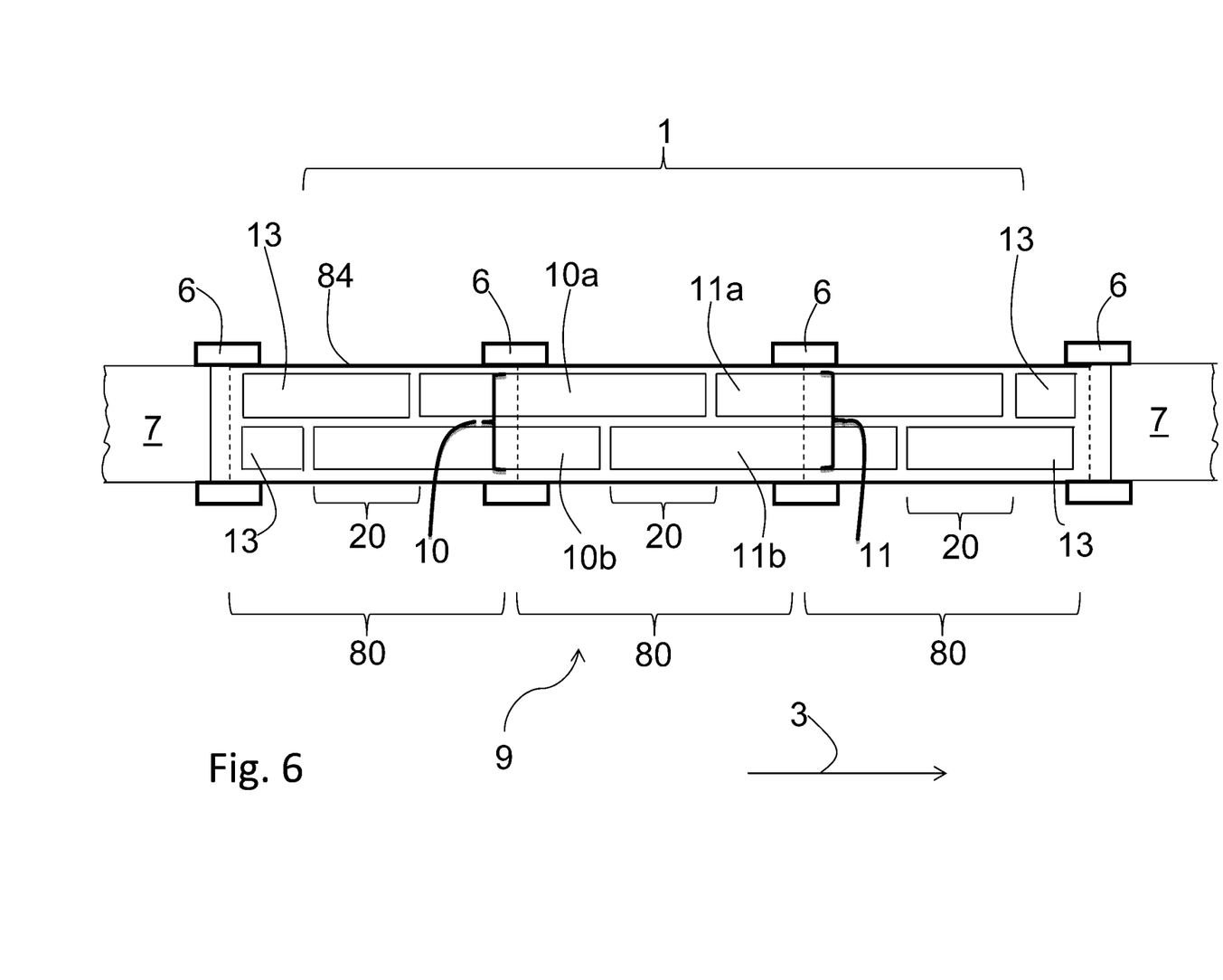
FIG. 6 shows a schematic representation of the integration of a conveyor unit according to the invention into a transport system.

FIG. 6 schematically shows part of a transport system 9, into which a conveyor unit 1 according to the invention is integrated. In the embodiment shown to the conveyor unit 1 there correspond three frame modules 80, which are located one after the other in a direction of transport 3 and are connected with each other by connecting means 6 provided at side elements 84 of the frame modules 80. Two of the frame modules 80 are connected each with a further element 7 of the transport system 9, also by connecting means 6. The boundaries between the frame modules 80, or between a frame module 80 and a further element 7, respectively, are indicated by dashed lines. The conveyor unit 1 comprises a first conveyor chain 10 and a second conveyor chain 11. Each conveyor chain 10, 11 comprises a first conveyor sub-chain 10a, 11a and a second conveyor sub-chain 10b, 11b. The conveyor sub-chains 10a, 11a, 10b, 11b are mounted in the frame modules 80. In the frame modules 80 connected to the further elements 7 also further conveyor sub-chains 13 are mounted. Between the first conveyor sub-chain 10a of the first conveyor chain 10 and the second conveyor sub-chain 11b of the second conveyor chain 11a region of overlap 20 is formed. In a completely analogous fashion a corresponding region of overlap 20 between the first conveyor sub-chain 11a of the second conveyor chain 11 and a further conveyor sub-chain 13 is formed, and likewise between a further conveyor sub-chain 13 and the second conveyor sub-chain 10b of the first conveyor chain 10. It is evident from the figure that some conveyor sub-chains 10a, 11a, 10b, 11b extend beyond an individual frame module 80 and thus form a continuous transport surface extending beyond the respective frame module 80.

The connection with the further elements 7 of the transport system 9 is a straight slide region. It is obvious to a person skilled in the art that therein slide plates may be used. Another alternative obvious to a person skilled in the art is to use lateral slide regions with corresponding guides instead of the straight connection with the further elements 7.

Plural conveyor units 1 according to the invention may be integrated in a transport system 9, following one another along a transport stream either immediately or with further elements 7 of the transport system 9 in between.

Figure 7:
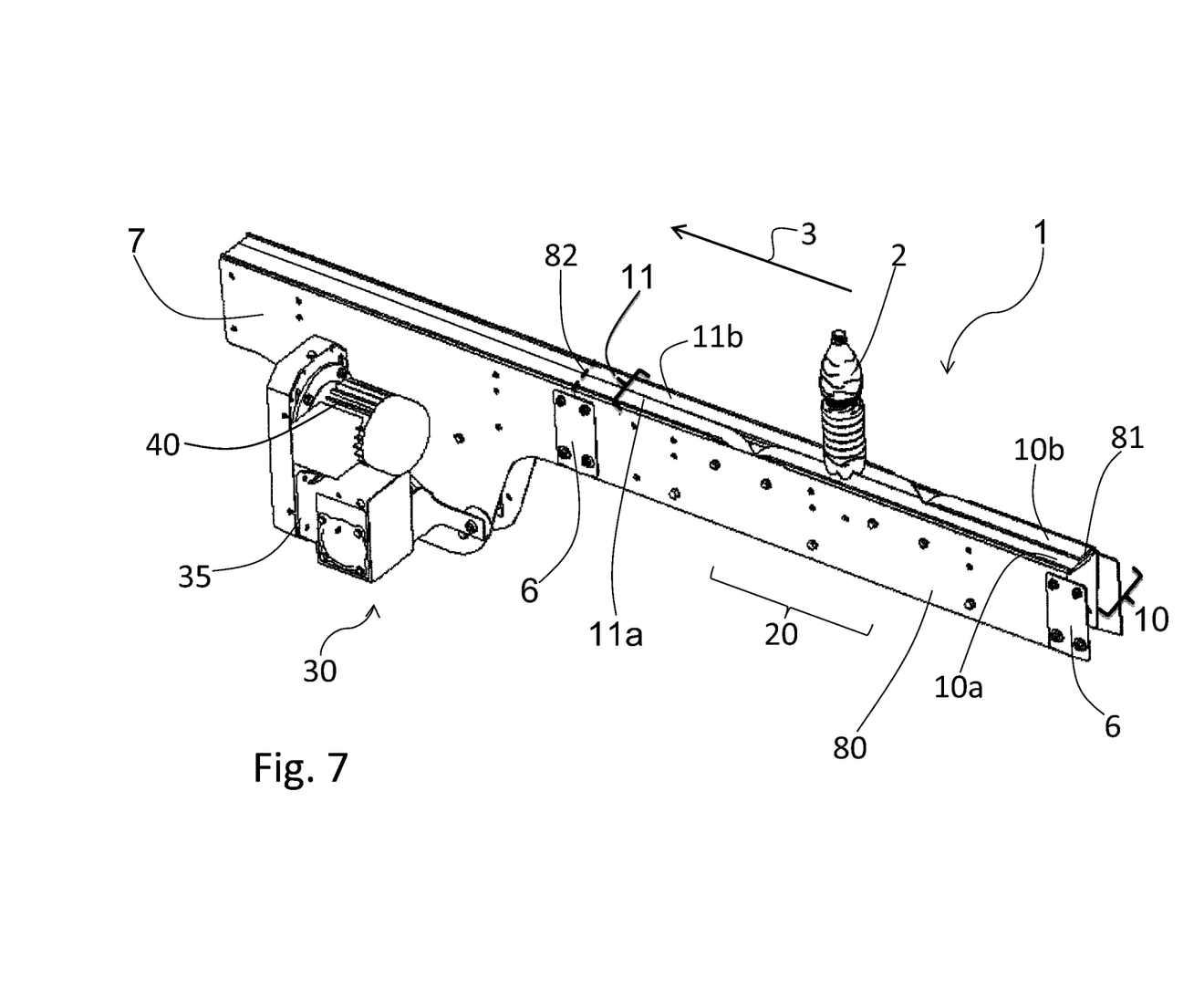
FIG. 7 is a perspective view of an embodiment of the conveyor unit according to the invention connected with a further element of a transport system; and, FIG. 8 shows a part of a transport system according to the invention, comprising a plurality of conveyor units according to the invention arranged in parallel.

FIG. 7 shows an embodiment of the conveyor unit 1 according to the invention connected with a further element 7 by connecting elements 6 at a second frame module end 82 of a frame module 80 of the conveyor unit 1. A first frame module end 81 also exhibits connecting elements 6 in the figure. An article 2, here a bottle, transported in a direction of transport 3, is situated in a region of overlap 20 between a first conveyor sub-chain 10a of a first conveyor chain 10 and a second conveyor sub-chain 11b of a second conveyor chain 11. A motor 40 with a gear 35 here is provided at the further element 7, and drives the conveyor sub-chains 11a, 11b of the second conveyor chain 11, which extend beyond the second frame module end 82 into the further element 7 and thus form a continuous transport surface. The motor 40 and the gear 35 here are elements of a center drive 30. The conveyor sub-chains 10a, 10b of the first conveyor chain 10 extend beyond the first frame module end 81, but are shown cut at the first frame module end 81 in the figure. For driving the conveyor sub-chains 10a, 10b of the first conveyor chain 10 in this embodiment a further motor (not shown) is provided, which, with respect to the direction of transport 3, is located before the frame module 80 shown.

Figure 8:
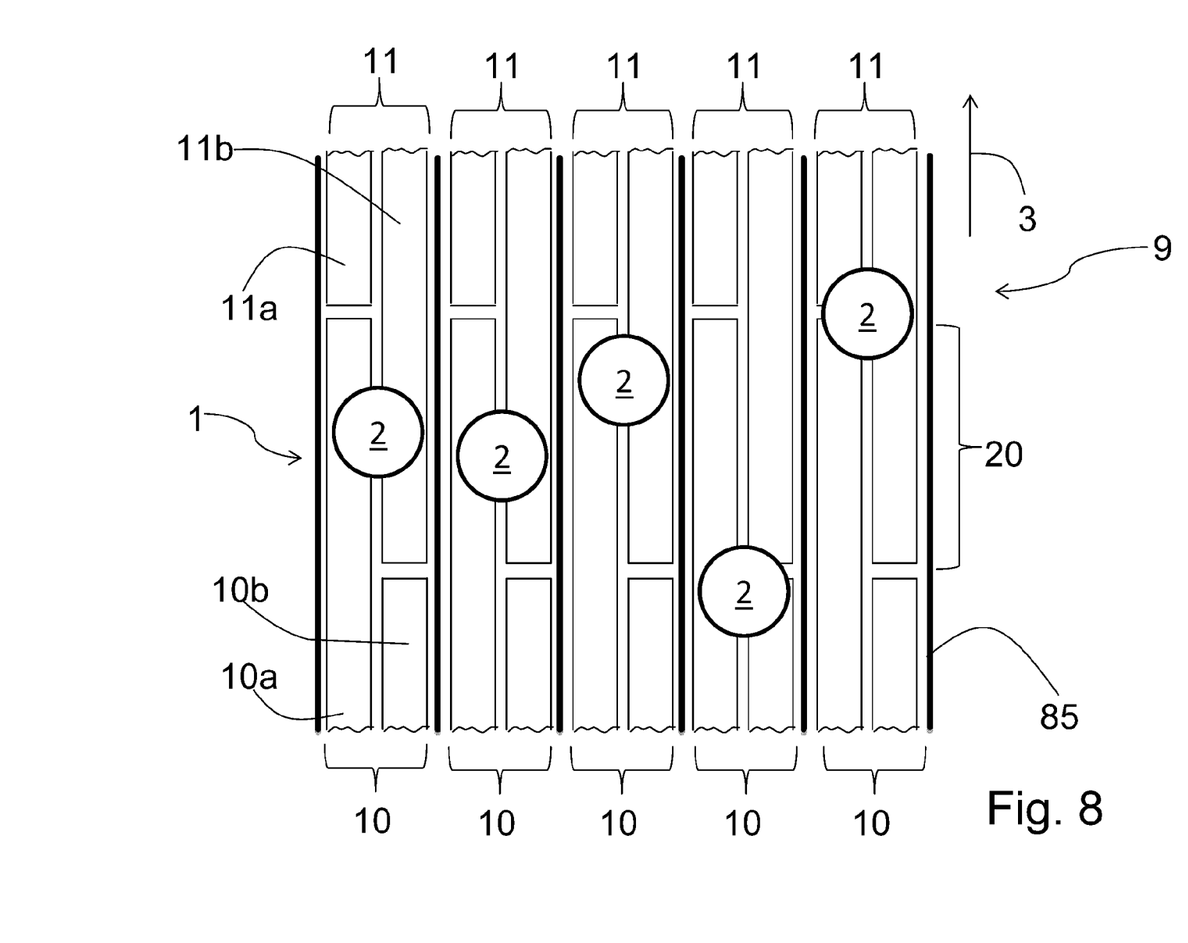

FIG. 8 shows a transport system 9 comprising a plurality (here five) conveyor units 1 according to the invention, arranged parallel to each other. Each conveyor unit 1 comprises a first conveyor chain 10 and a second conveyor chain 11 located downstream from the respective first conveyor chain 10 in a direction of transport 3, in order to transport articles 2 in the direction of transport 3. Each first conveyor chain 10 comprises a first conveyor sub-chain 10a and a second conveyor sub-chain 10b. Each second conveyor chain 11 comprises a first conveyor sub-chain 11a and a second conveyor sub-chain 11b. In each conveyor unit 1 a region of overlap 20 is formed between the first conveyor sub-chain 10a of the first conveyor chain 10 and the second conveyor sub-chain 11b of the second conveyor chain 11. In the embodiment shown guides 85 for the articles 2 are provided between the conveyor units 1, without the presence of the guides 85 constituting a limitation of the invention. It is not necessary for the overlap regions 20 of the conveyor units 1 to be situated at the same position with respect to the direction of transport 3, either.

The invention has been described with reference to preferred embodiments. It is obvious to a person skilled in the art, however, that modifications and alterations are possible, without leaving the scope of the subsequent claims. In particular the configuration of the drive systems for the conveyor sub-chains and the location of the drive systems on the conveyor unit is not limited to the embodiments shown.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What is claimed is:

1. A conveyor unit for a transport system of articles, comprising:
   a first drivable conveyor chain;
   a second drivable conveyor chain, wherein the second conveyor chain is located downstream from the first conveyor chain in a direction of transport;
   two conveyor sub-chains forming each conveyor chain, wherein the conveyor sub-chains are arranged in such a way
   that a region of overlap between a conveyor sub-chain of the first conveyor chain and a conveyor sub-chain of the second conveyor chain is formed, and in such a way
   that each conveyor sub-chain of the first conveyor chain is followed in the direction of transport by a conveyor sub-chain of the second conveyor chain without a displacement between the respective conveyor sub-chains transverse to the direction of transport,
   wherein a velocity of at least one conveyor sub-chain is such that an alteration of a state of motion of the articles transported in the direction of transport is achievable within the conveyor unit; and,
   at least one frame module exhibiting a first frame module end and a second frame module end, located opposite each other in the direction of transport, wherein at least one conveyor sub-chain extends beyond at least one frame module end.

2. The conveyor unit of claim 1, wherein the conveyor sub-chains are endless chains, and those conveyor sub-chains between which the region of overlap is formed are conducted via one redirecting means each in the region of overlap, wherein the redirecting means are displaced with respect to each other in the direction of transport; and wherein the redirecting means for the conveyor sub-chain of the first conveyor chain directs the top section of the conveyor sub-chain to a return section of the conveyor sub-chain, and the redirecting means for the conveyor sub-chain of the second conveyor chain directs the top section of the conveyor sub-chain out of a return section of the conveyor sub-chain.

3. The conveyor unit of claim 1, wherein at least one conveyor sub-chain is drivable with a first velocity and at least one further conveyor sub-chain is drivable with a second velocity, wherein the first velocity is different from the second velocity.

4. The conveyor unit of claim 1, wherein all conveyor sub-chains are drivable each with a separately settable velocity.

5. The conveyor unit of claim 1, wherein a width of the first conveyor chain is equal to a width of the second conveyor chain and larger than an effective diameter of the articles transported by the conveyor unit.

6. The conveyor unit of claim 1, wherein all conveyor sub-chains have an equal width, which preferentially is larger than half the effective diameter and is between 50% and 75% of the effective diameter.

7. The conveyor unit of claim 1, wherein a center drive corresponds to at least one conveyor chain, by which both the conveyor sub-chains of the respective conveyor chain are drivable.

8. The conveyor unit of claim 1, wherein a motor is in cooperation with a drive-belt system so that both conveyor sub-chains of at least one conveyor chain are drivable.

9. The conveyor unit of claim 1, wherein a motor corresponds to each conveyor unit for driving the conveyor sub-chains of the first conveyor chain and the conveyor sub-chains of the second conveyor chain of the conveyor unit, and wherein furthermore at least one force transmission means is provided which exhibits at least one gear, through which a difference between the respective velocities, at which, respectively, at least one conveyor sub-chain is drivable, is settable.

10. The conveyor unit of claim 1, wherein a motor for driving at least one conveyor sub-chain is located on at least one frame module.

11. The conveyor unit of claim 1, wherein a guide element is provided on either side of the at least one frame module and extends along the direction of transport, for the articles.

12. The conveyor unit of claim 1, wherein at least one connecting means is provided at least on the first frame module end or at least on the second frame module end, wherein the connecting means mechanically connects the conveyor unit with further elements of the transport system.

13. The conveyor unit of claim 1, wherein in the region of a gap between conveyor sub-chains located one after the other in the direction of transport a top section of the conveyor sub-chain continuing through this region is conducted at an increased height with respect to the top sections of the conveyor sub-chains located one after the other in the direction of transport in this region.

14. A transport system for articles, comprising:
- a plurality of conveyor units wherein at least two conveyor units are located one downstream from the other along a transport stream of articles and wherein at least two conveyor units are arranged parallel to each other;
- a first drivable conveyor chain and a second drivable conveyor chain forming each of the conveyor units, wherein the second conveyor chain is located downstream from the first conveyor chain in a direction of transport;
- two conveyor sub-chains forming each conveyor chain wherein the conveyor sub-chains are arranged in such a way
  - that a region of overlap between a conveyor sub-chain of the first conveyor chain and a conveyor sub-chain of the second conveyor chain is formed, in such a way that each conveyor sub-chain of the first conveyor chain is followed in the direction of transport by a conveyor sub-chain of the second conveyor chain without a displacement between the respective conveyor sub-chains transverse to the direction of transport,
- wherein a velocity of at least one conveyor sub-chain is such that an alteration of a state of motion of the articles transported in the direction of transport is achievable within the conveyor unit; and,
- at least one frame module for a conveyor unit, the frame module exhibiting a first frame module end and a second frame module end, located opposite each other in the direction of transport, wherein at least one conveyor sub-chain extends beyond at least one frame module end.

15. The transport system of claim 14, wherein the conveyor sub-chains of each conveyor unit are endless chains, and those conveyor sub-chains between which the region of overlap is formed, are conducted via one redirecting means each in the region of overlap, wherein the redirecting means are displaced with respect to each other in the direction of transport, and wherein the redirecting means for the conveyor sub-chain of the first conveyor chain directs the top section of the conveyor sub-chain to a return section of the conveyor sub-chain, and the redirecting means for the conveyor sub-chain of the second conveyor chain directs the top section of the conveyor sub-chain out of a return section of the conveyor sub-chain.

16. The transport system of claim 14, wherein at least one conveyor sub-chain of each conveyor unit is drivable with a first velocity and at least one further conveyor sub-chain is drivable with a second velocity, wherein the first velocity is different from the second velocity.

17. The transport system of claim 14, wherein all conveyor sub-chains of each conveyor unit are drivable each with a separately settable velocity.

18. A method for changing the velocity of an article in a transport system, the method comprising the following steps:
- providing the article on a first conveyor chain formed by a first conveyor sub-chain and a second conveyor sub-chain, wherein the first and second conveyor sub-chains are driven at a first velocity; and,
- transferring the article from the first conveyor chain to a second conveyor chain formed by a first conveyor sub-chain and a second conveyor sub-chain, wherein the first and second conveyor sub-chains are driven at a second velocity which is different from the first velocity,
- wherein the transfer of the article from the first conveyor chain to the second conveyor chain is effected by
- first transferring the article from the second conveyor sub-chain of the first conveyor chain to the second conveyor sub-chain of the second conveyor chain, the article therein being supported by the first conveyor sub-chain of the first conveyor chain,
- subsequently transferring the article from the first conveyor sub-chain of the first conveyor chain to the first conveyor sub-chain of the second conveyor chain, the article therein being supported by the second conveyor sub-chain of the second conveyor chain; and,
- wherein during the transfer between conveyor sub-chains the conveyor sub-chain supporting the article is conducted at a height increased with respect to the conveyor sub-chains between which the transfer is effected.

\* \* \* \* \*